No. 664,805. Patented Dec. 25, 1900.
C. B. BOSWORTH.
PRESSURE GAGE TESTING APPARATUS.
(Application filed May 7, 1900.)

(No Model.)

WITNESSES
E. J. Green
Frank G. Brown

INVENTOR
Charles B. Bosworth

UNITED STATES PATENT OFFICE.

CHARLES B. BOSWORTH, OF EVERETT, MASSACHUSETTS, ASSIGNOR TO THE ASHTON VALVE COMPANY, OF HARTFORD, CONNECTICUT.

PRESSURE-GAGE-TESTING APPARATUS.

SPECIFICATION forming part of Letters Patent No. 664,805, dated December 25, 1900.

Application filed May 7, 1900. Serial No. 15,829. (No model.)

*To all whom it may concern:*

Be it known that I, CHARLES B. BOSWORTH, of Everett, in the county of Middlesex and State of Massachusetts, have invented a new and useful Improvement in Pressure-Gage-Testing Apparatus, of which the following, taken in connection with the accompanying drawings, is a specification.

My invention relates to a device for testing pressure-gages; and it consists in the arrangements and construction of the parts, and especially the construction of the device that acts as a transmitter of the pressure force due to the weights to the transmitting fluid.

The object is to make a very compact and accurately-working gage-tester of large range. This object I attain by the mechanism shown in the accompanying drawings, in which—

Figure 1:
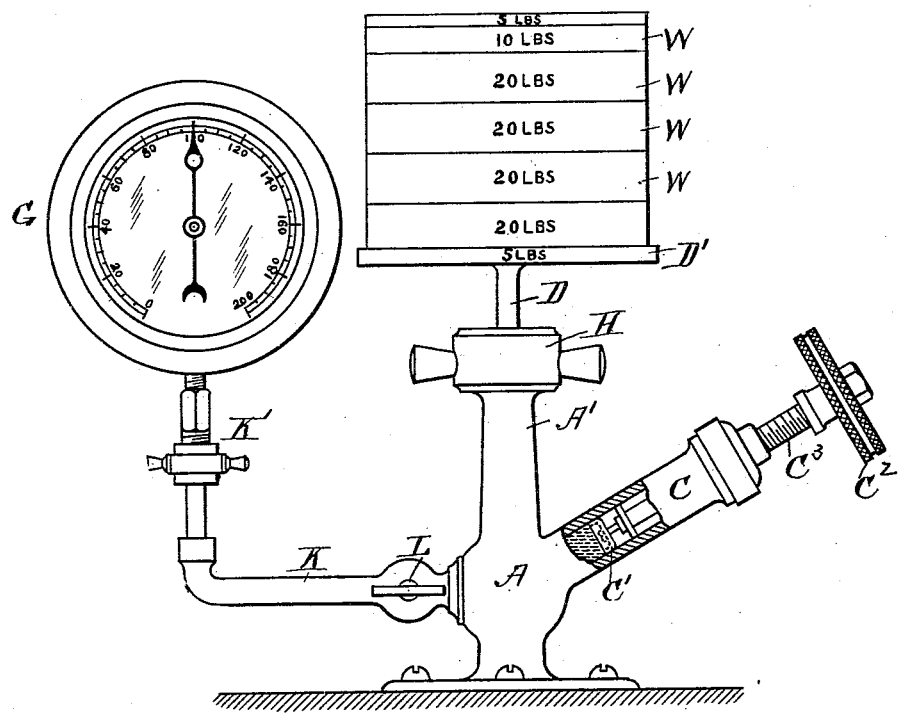
Figures 2, 3, 4:
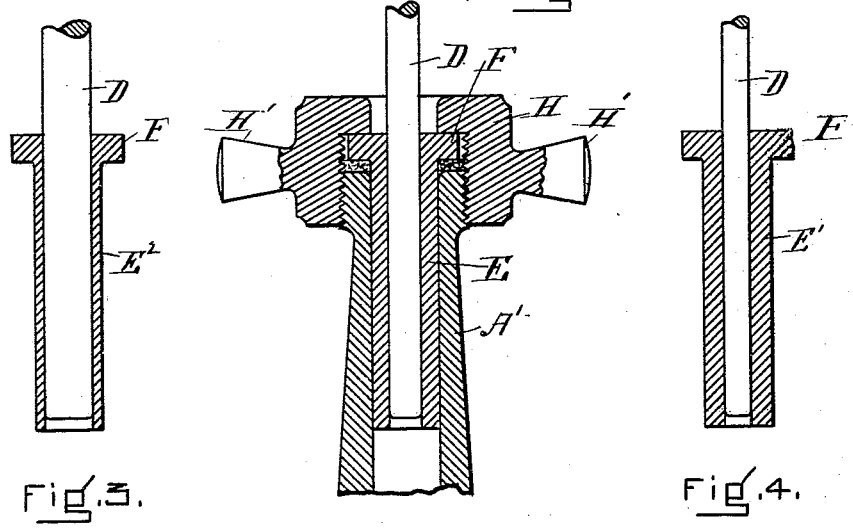

Figure 1 is an elevation showing the gage, a part of the adjusting-cylinder being represented as cut away to show the construction of the adjusting-piston. Fig. 2 is a vertical section showing the transmitter device. Figs. 3 and 4 are details.

In the drawings, A represents the base or standard to which the operating parts are connected.

A' is a hollow standard interiorly connected to the adjusting-cylinder C and to the pipe K, which in turn is connected by a coupling K' to the gage G which is to be tested. A piston D, having an attached disk D', works in the standard A'. The various weights W W are placed, as shown, so that their combined weights will act upon the piston D. The number and kind of weights so placed will depend upon the amount of pressure to be tested.

The cylinder C has a piston C' attached to the end of the screw-stem $C^3$, which is turned by the hand-wheel $C^2$. The piston C' is made to fit fluid-tight and rests upon the fluid contents of the apparatus, so that any movement of the piston C' will cause a corresponding movement or adjustment of the fluid. Pistons of different sizes may be used—that is, the cross-sectional area may be one-tenth, one-fifth, or one-fourth of an inch or of any area that may be desired. For convenience in computing it is usual to have the area of the piston some decimal fraction of an inch.

To increase the range of this testing apparatus, different pistons are used. To enable the use of different-sized pistons in the same standard A, I have the following-described construction: The head H is screwed onto the upper end of the standard A, as shown in Fig. 2, it being provided with projecting handles H' H' for convenience in taking it off or putting it on. This head H also serves as a part of a stuffing-box. For fitting different-sized pistons I have a variety of sleeves, as E, E', and $E^2$. These sleeves all have the same exterior diameter and the same-sized heads, so that they will all fit the standard A'. Therefore to use a different piston the operator has only to unscrew the head H and substitute a new sleeve—that is, a sleeve that will fit the piston required.

I claim—

In a pressure-gage-testing apparatus, a cylinder-standard containing a pressure-transmitting fluid, and having a piston of determined area and adapted to support weights as described and to be balanced by the said fluid: a pipe, as K, adapted to interiorly connect the said cylinder with the gage to be tested: sleeves of different internal diameters for receiving pistons of different sizes, said sleeves all having the same external diameter and the same heads, as F, whereby they fit the same cylinder-standard, and means for holding the said sleeves, substantially as and for the purpose set forth.

In testimony whereof I have signed my name to this specification, in the presence of two subscribing witnesses, on this 16th day of April, A. D. 1900.

CHARLES B. BOSWORTH.

Witnesses:
  E. T. GREEN,
  FRANK G. BROWN.